US008737756B2

(12) United States Patent
DaneshPanah et al.

(10) Patent No.: US 8,737,756 B2
(45) Date of Patent: *May 27, 2014

(54) SYSTEM AND METHOD FOR DEPTH FROM DEFOCUS IMAGING

(71) Applicant: General Electric Company, Schenectady, NY (US)

(72) Inventors: Mohammad Mehdi DaneshPanah, Latham, NY (US); Kevin George Harding, Niskayuna, NY (US); Gil Abramovich, Niskayuna, NY (US); Daniel Curtis Gray, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,534

(22) Filed: Dec. 19, 2012

(65) Prior Publication Data

US 2013/0141538 A1    Jun. 6, 2013

Related U.S. Application Data

(63) Continuation of application No. 13/272,424, filed on Oct. 13, 2011, now Pat. No. 8,340,456.

(51) Int. Cl.
*G06K 9/40* (2006.01)
*H04N 9/04* (2006.01)

(52) U.S. Cl.
USPC ..................................... 382/255; 348/207.99

(58) Field of Classification Search
None
See application file for complete search history.

(56) References Cited

U.S. PATENT DOCUMENTS

| | | | |
|---|---|---|---|
| 3,639,041 A | 2/1972 | Cornsweet | |
| 4,952,815 A | 8/1990 | Nishi | |
| 5,231,443 A * | 7/1993 | Subbarao | ...................... 348/348 |
| 5,594,768 A | 1/1997 | Fujii et al. | |
| 5,878,152 A | 3/1999 | Sussman | |
| 5,883,703 A | 3/1999 | Knirck et al. | |
| 5,985,495 A | 11/1999 | Okumura et al. | |
| 6,219,461 B1 | 4/2001 | Wallack | |
| 6,229,913 B1 | 5/2001 | Nayar et al. | |
| 6,806,899 B1 | 10/2004 | Schaack | |
| 6,842,290 B2 * | 1/2005 | Liang et al. | ................... 359/619 |
| 7,379,621 B2 | 5/2008 | Aoki | |

(Continued)

OTHER PUBLICATIONS

Abramovich et al., "Real-Time 3D Part Metrology Using Polarization Rotation," Proc. SPIE 7432, Jul. 2009, pp. 1-14.

(Continued)

*Primary Examiner* — Manav Seth
(74) *Attorney, Agent, or Firm* — Ziolkowski Patent Solutions Group, SC; Jean K. Testa

(57) ABSTRACT

An imaging system includes a positionable device configured to axially shift an image plane, wherein the image plane is generated from photons emanating from an object and passing through a lens, a detector plane positioned to receive the photons of the object that pass through the lens, and a computer programmed to characterize the lens as a mathematical function, acquire two or more elemental images of the object with the image plane of each elemental image at different axial positions with respect to the detector plane, determine a focused distance of the object from the lens, based on the characterization of the lens and based on the two or more elemental images acquired, and generate a depth map of the object based on the determined distance.

17 Claims, 6 Drawing Sheets

(56) References Cited

U.S. PATENT DOCUMENTS

| | | | |
|---|---|---|---|
| 7,558,709 B2 | 7/2009 | Subbarao | |
| 7,977,625 B2 * | 7/2011 | Schwertner | 250/252.1 |
| 2008/0075444 A1 | 3/2008 | Subbarao et al. | |
| 2011/0228070 A1 | 9/2011 | Mehanian et al. | |

OTHER PUBLICATIONS

Abramovich et al., "Mobile, Contactless, Single-Shot, Fingerprint Capture System," Proc. SPIE 7667, Sep. 2009, pp. 1-14.

Abramovich et al., "A Spoof Detection Method for Contactless Fingerprint Collection Utilizing Spectrum and Polarization Diversity," Proc. SPIE 7680, Apr. 2010, pp. 1-14.

Cho et al., "Depth Maps Created from Blur Information Using Images with Focus at Near and at Far," SPIE-IS&T Electronic Imaging, SPIE vol. 6055, 2006, pp. 1-12.

Xiong et al., "Depth from Focusing and Defocusing," The Robotics Institute, Carnegie Mellon University, Pittsburgh, PA, Mar. 1993, pp. 1-28.

Subbarao et al., "Depth from Defocus: A Spatial Domain Approach," pp. 1-33, published in the International Journal of Computer Vision, vol. 13, No. 3, 1994, pp. 271-294.

Ghita et al., "Computational approach for depth from defocus," Journal of Electronic Imaging, vol. 14(2), Apr.-Jun. 2005, pp. 1-8.

Ens et al., "An Investigation of Methods for Determining Depth from Focus," IEEE Transactions on Pattern Analysis and Machine Intelligence, vol. 15, No. 2, Feb. 1993, pp. 97-108.

Favaro et al., "A Geometric Approach to Shape from Defocus," IEEE Transactions on Pattern Analysis and Machine Intelligence, vol. 27, No. 3, Mar. 2005, pp. 406-417.

Girod et al., "Depth from Defocus of Structured Light," SPIE, vol. 1194 Optics, Illumination, and Image Sensing for Machine Vision IV, 1989, pp. 209-215.

Harding et al., "3D Imaging System for Biometric Applications," Proc. SPIE 7690, Apr. 2010, pp. 1-15.

Kang et al., "Robust Depth-from-Defocus for Autofocusing in the Presence of Image Shifts," Proc. SPIE 7066, 2008, pp. 1-10.

Pentland, "A New Sense for Depth of Field," IEEE Transactions on Pattern Analysis and Machine Intelligence, vol. PAMI-9, No. 4, Jul. 1987, pp. 523-531.

Pentland et al., "A Simple, Real-Time Range Camera," IEEE CVPR, 1989, pp. 256-261.

Watanabe et al., "Rational Filters for Passive Depth from Defocus," International Journal of Computer Vision, vol. 27(3), 1998, Kluwer Academic Publishers, Manufactured in The Netherlands, pp. 203-225.

Watanabe et al., "Real-time computation of depth from defocus," SPIE, 1995, pp. 1-12.

Xian et al., "Performance Evaluation of Different Depth From Defocus (DFD) Techniques," Proc. of SPIE, vol. 6000, 2005, pp. 1-13.

Xian et al., "Camera Calibration and Performance Evaluation of Depth From Defocus (DFD)," SPIE, vol. 6000, 2005, pp. 1-10.

* cited by examiner

SYSTEM AND METHOD FOR DEPTH FROM DEFOCUS IMAGING

CROSS-REFERENCE TO RELATED APPLICATION

The present application is a continuation of, and claims priority to, U.S. non-provisional application Ser. No. 13/272,424, filed Oct. 13, 2011, the disclosure of which is incorporated herein by reference.

GOVERNMENT LICENSE RIGHTS

This invention was made with Government support under grant number HSHQDC-10-C-00083 awarded by the Department of Homeland Security. The Government has certain rights in the invention.

BACKGROUND OF THE INVENTION

Embodiments of the invention relate generally to a system and method for depth from defocus imaging, and more particularly to a contactless multi-fingerprint collection device.

It is well known that the patterns and geometry of fingerprints are different for each individual and are unchanged over time. Thus fingerprints serve as extremely accurate identifiers of an individual since they rely on un-modifiable physical attributes. The classification of fingerprints is usually based on certain characteristics such as arch, loop or whorl, with the most distinctive characteristics being the minutiae, the forks, or endings found in the ridges and the overall shape of the ridge flow.

Traditionally, fingerprints have been obtained by means of ink and paper, where a subject covers a surface of their finger with ink and presses/rolls their finger onto paper or a similar surface to produce a rolled fingerprint. More recently, various electronic fingerprint scanning systems have been developed that obtain images of fingerprints utilizing an optical fingerprint image capture technique. Such electronic fingerprint scanning systems have typically been in the form of contact based fingerprint readers that require a subject's finger to be put in contact with a screen and then physically rolled across the screen to provide an optically acquired full rolled-image fingerprint. However, contact-based fingerprint readers have significant drawbacks associated therewith. For example, in a field environment, dirt, grease or other debris may build up on the window of contact based fingerprint readers, so as to generate poor quality fingerprint images. Additionally, such contact-based fingerprint readers provide a means of spreading disease or other contamination from one person to another.

In recent electronic fingerprint scanning systems, contactless fingerprint readers capture fingerprints without the need for physical contact between a subject's finger and a screen. The goal is to generate a rolled equivalent fingerprint image using a contactless imaging system in which images are formed by a lens. Conventional imaging provides 2D representation of the object, whereas to generate the rolled equivalent fingerprint, one requires the 3D profile of the finger. For an object such as a finger, some parts of the object are in focus and some are defocused when imaged with a shallow depth of field imaging system. Typically, an in-focus region is a region of an object that is in as sharp as possible focus, and conversely defocus refers to a lack of focus, the degree of which can be calculated between two images. Known systems may generate a depth map of the object using either a depth from focus (DFF) or a depth from defocus (DFD) algorithm.

In one system, a contactless fingerprint scanning system acquires an image of the finger by utilizing a structured light source, and a 3D image is generated using a DFF algorithm. In a DFF algorithm, as an example, many measurements are made at various focal plane positions and the many measurements are used to generate a depth map. Typically, the various focal plane positions are obtained by either physical movement of the object or lens, or by adjustment of the focal plane (using known techniques or using one or more birefringent lenses producing focal shifts at different polarization angles passing therethrough). DFF-based systems, however, typically require many measurements to be obtained and also may include adjustment of the focal plane to focus on the object, as well as a structured light source.

For a given object, the amount of defocus depends on at least two parameters: 1) a distance of the object to the lens, and 2) the lens characteristics. If the second parameter (i.e., the lens characteristics) is known, and the system can accurately measure an amount of defocus, then the object distance can be determined. Such forms the basis of known DFD algorithms.

Thus, in some contactless finger print readers, the system acquires an image of the finger by utilizing a white light source, and a 3D image is generated using a DFD algorithm. In a DFD algorithm, a defocus function acts as a convoluting kernel with the fingerprint, and the most direct way to recover it is through the frequency domain analysis of obtained image patches. Essentially, as the amount of defocus increases, the convolving kernel's width decreases, resulting in elimination of high frequency content.

DFD algorithms typically start with an assumption of a simplified Gaussian or pillbox estimator for a point spread function (PSF), building up on a polychromatic illumination assumption. Typically, an object point, when imaged, will look like a bell curve rather than a sharp point. The function describing the shape of the bell curves is called the 'PSF', and the shape of the PSF on an image detector depends on the distance of the object point to the lens, as well as internal lens characteristics. Thus, these assumptions simplify the mathematical derivations and provide a convenient approach to DFD. The extent to which such assumptions hold depends on the particular imaging system and illumination condition. For highly corrected imaging optics and white light illumination, the PSF resembles a Gaussian or a pillbox and assuming so typically generates a depth estimator with a reasonable error. However, it can be shown that depth estimation based on DFD is highly sensitive to proper determination of PSF structure, and applying DFD based on Gaussian (or pillbox) PSF models to an imaging system where PSF departs from this assumption results in unreliable depth estimates. That is, the simplified model does not adequately describe physical lens behavior when there is a high degree of aberration, when a lens has a small depth-of-field compared to object size, when quasi-monochromatic light is used (such as an LED), or when monochromatic light is used (such as a laser), as examples. Thus, known DFD systems fail to estimate object distance and fail to accurately reproduce a fingerprint in a contactless system.

Therefore, it would be desirable to design a system and method of acquiring fingerprints in a contactless application that accounts for lens imperfections.

BRIEF DESCRIPTION OF THE INVENTION

Embodiments of the invention are directed to a system and method for contactless multi-fingerprint collection.

According to one aspect of the invention, an imaging system includes an imaging system includes a positionable device configured to axially shift an image plane, wherein the image plane is generated from photons emanating from an object and passing through a lens, a detector plane positioned to receive the photons of the object that pass through the lens, and a computer programmed to characterize the lens as a mathematical function, acquire two or more elemental images of the object with the image plane of each elemental image at different axial positions with respect to the detector plane, determine a focused distance of the object from the lens, based on the characterization of the lens and based on the two or more elemental images acquired, and generate a depth map of the object based on the determined distance.

According to another aspect of the invention, a method of imaging includes mathematically characterizing a lens as a mathematical function, acquiring two or more elemental images of an object with an image plane of the object at differing axial positions with respect to a detector, determining a first focused distance of the image plane to the object such that the image plane is located at the detector, based on the mathematical characterization of the lens and based on the first and second elemental images, and generating a depth map of the object based on the determination.

According to yet another aspect of the invention, a non-transitory computer readable storage medium having stored thereon a computer program comprising instructions which, when executed by a computer, cause the computer to derive a pupil function of a lens, acquire elemental images of an object at different locations of an image plane of the object with respect to a detector, determine where to place the image plane of the first patch of the object based on the pupil function and based on the acquired elemental images of the first patch of the object, and generate a depth map of the object based on the determination.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

According to the invention, a mathematical model is used that governs lens behavior. The model is affected by object distance and physical characteristics of the lens (i.e., aberrations, focal length, etc. . . . ). Information from focus planes (DFF) and from an amount of defocus (DFF) is combined to yield a depth map. Following is a description of an algorithm for a contactless fingerprint imaging system according to embodiments of the invention. However, the invention is not limited to such a system and it is contemplated that the disclosed invention may be applicable to any imaging system that uses passive depth estimation from a set of slightly defocused images such as 3D microscopic profilometry for inspection in industrial applications, 3D borescope imaging, 3D in-situ medical imaging, 3D consumer cameras (with proper focus shifting lenses), passive imaging for 3D target recognition (defense or security industries), and the like.

Figure 1:
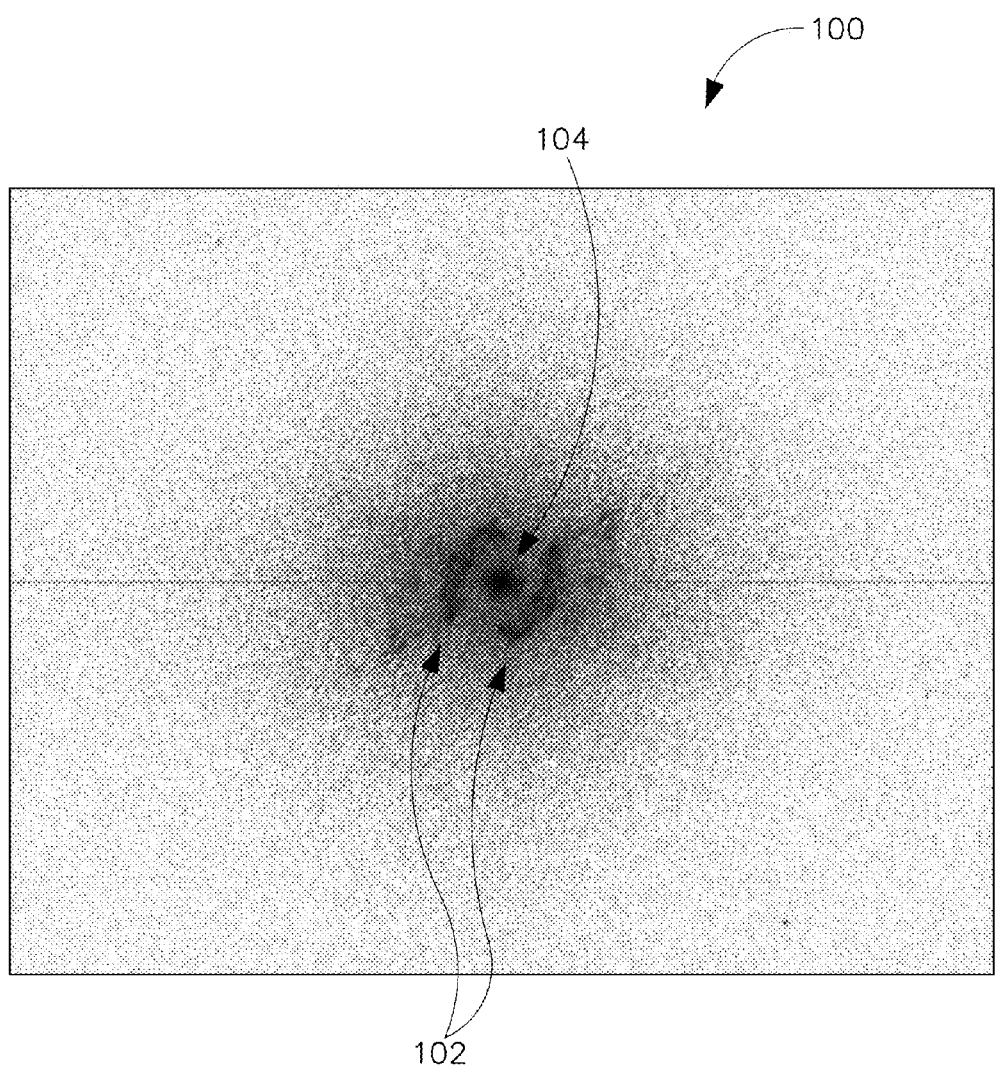
FIG. 1 illustrates a typical fingerprint spectrum.

FIG. 1 illustrates a typical fingerprint spectrum 100 that may be obtained from a common fingerprint and generated using a Fourier transform, as known in the art. In a typical fingerprint and in the frequency domain it is evident that the patterns exhibit a distinct periodicity that is represented in the spectral data as an abrupt concentration or halo 102. Hence, useful information, in terms of depth estimation, can be extracted in fingerprint imaging based on this known periodicity.

The DC component 104 (near the center of the spectral data of FIG. 1) may be separated from the higher frequency halo 102 that is symmetric and can be attributed to the fingerprint marks. The spectrum can be transformed to polar coordinates to generate a projection on a radial frequency axis using the following:

$$I_p(f_r) = \int_{-\pi}^{+\pi} I_p(f_r, \theta) d\theta,$$ Eqn. 1;

where $f_r$ denotes the radial frequency and $I_p(f_r, \theta)$ denotes the spectrum in polar coordinates.

Figure 2:
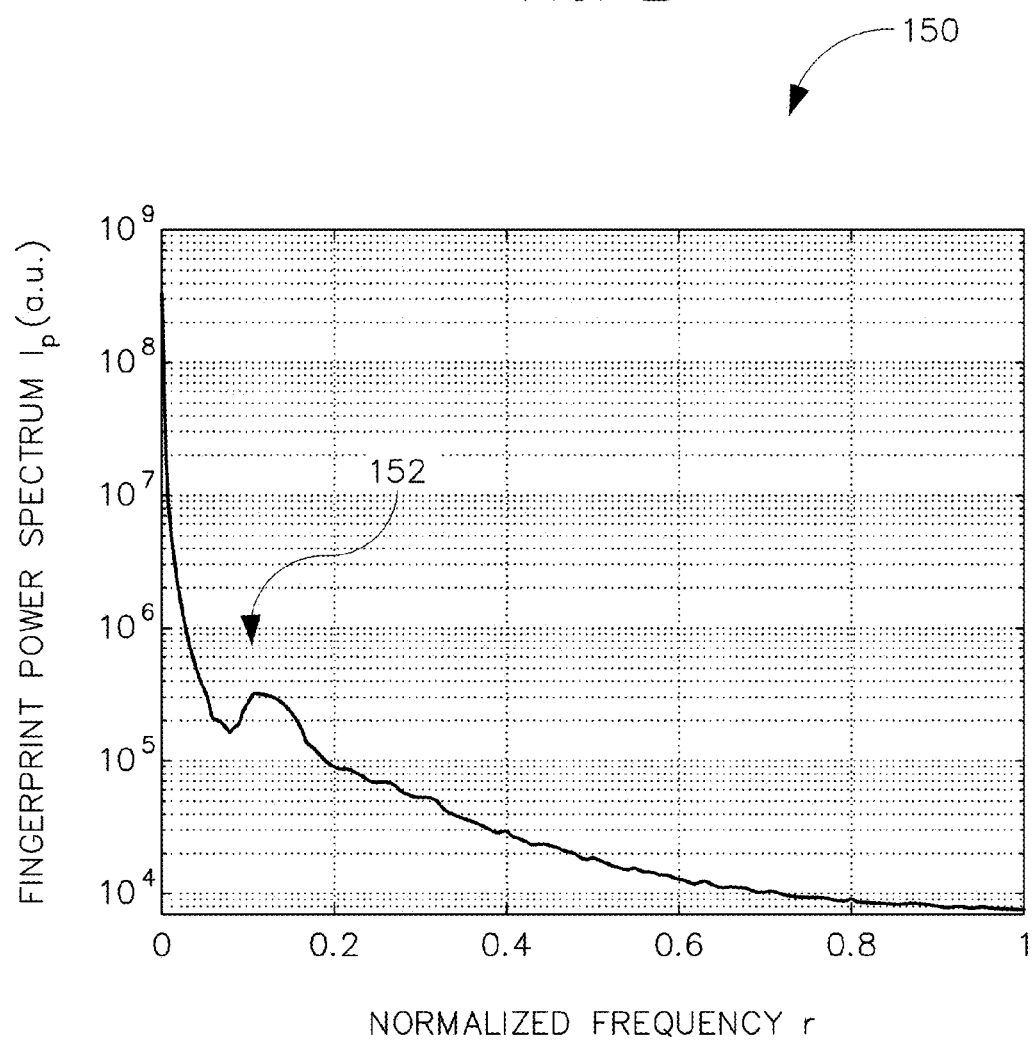
FIG. 2 illustrates an exemplary radial frequency spectrum of a typical fingerprint image.

FIG. 2 illustrates an exemplary radial frequency spectrum 150 of a typical fingerprint image. The actual fingerprint marks exhibit themselves through a hump 152 in spectrum 150. This is in contrast to expected behavior of natural images (i.e., those not having a generally symmetric pattern such as in a fingerprint), which may be modeled by an exponential decay of the form $I_p(f_r)=1/f_r^\alpha$. Typically, the most visible detailed features of a fingerprint image are the ridges and grooves, and it is the defocus of these features that is measured, according to embodiments of the invention.

Conventional DFD methods assume a certain form for a point spread function (PSF) of the lens, resulting in a use of known functions such as a Gaussian or a Pillbox function in lieu of PSF. However, when the real PSF shape departs significantly from assumptions, conventional DFD algorithms tend to provide poor results. That is, for an object like a fingerprint, having hump 152 in spectrum 150 as illustrated in FIG. 2, using a known and conventional blurring kernel can cause a conventional DFD method to break down, thus failing to provide a satisfactory final depth image using DFD.

Figure 3:
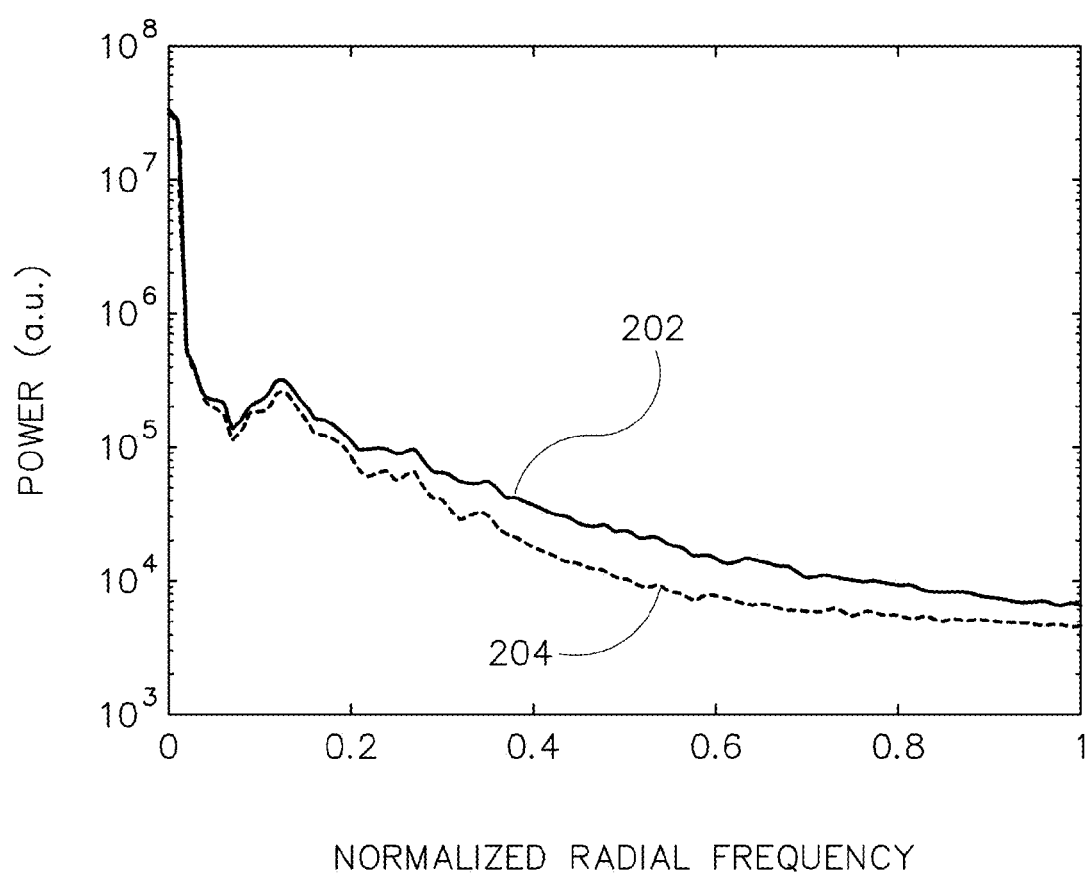
FIG. 3 illustrates a first radial spectrum and a second radial spectrum for images having different levels of blur.

For example, in order to illustrate that known DFD methods using a Gaussian or Pillbox function are not proper estimates for the blurring process, a patch of one image may be blurred with kernels of various size and shape, and the resulting image can be compared with a second image obtained by the imaging system. Beginning with a plot 200, referring to FIG. 3, a first radial frequency spectrum 202 and a second radial frequency spectrum 204 having differing levels of blur are illustrated. Thus, according to conventional DFD methods, known blurring kernels could be applied to, for instance, first radial frequency spectrum 202 in order to reproduce second radial frequency spectrum 204. The objective is to understand if, for instance, a Gaussian blurring kernel can in fact transform the first image, from which first radial frequency spectrum 202 is derived, to the second image, from which second radial frequency spectrum 204 is derived.

Figure 4:
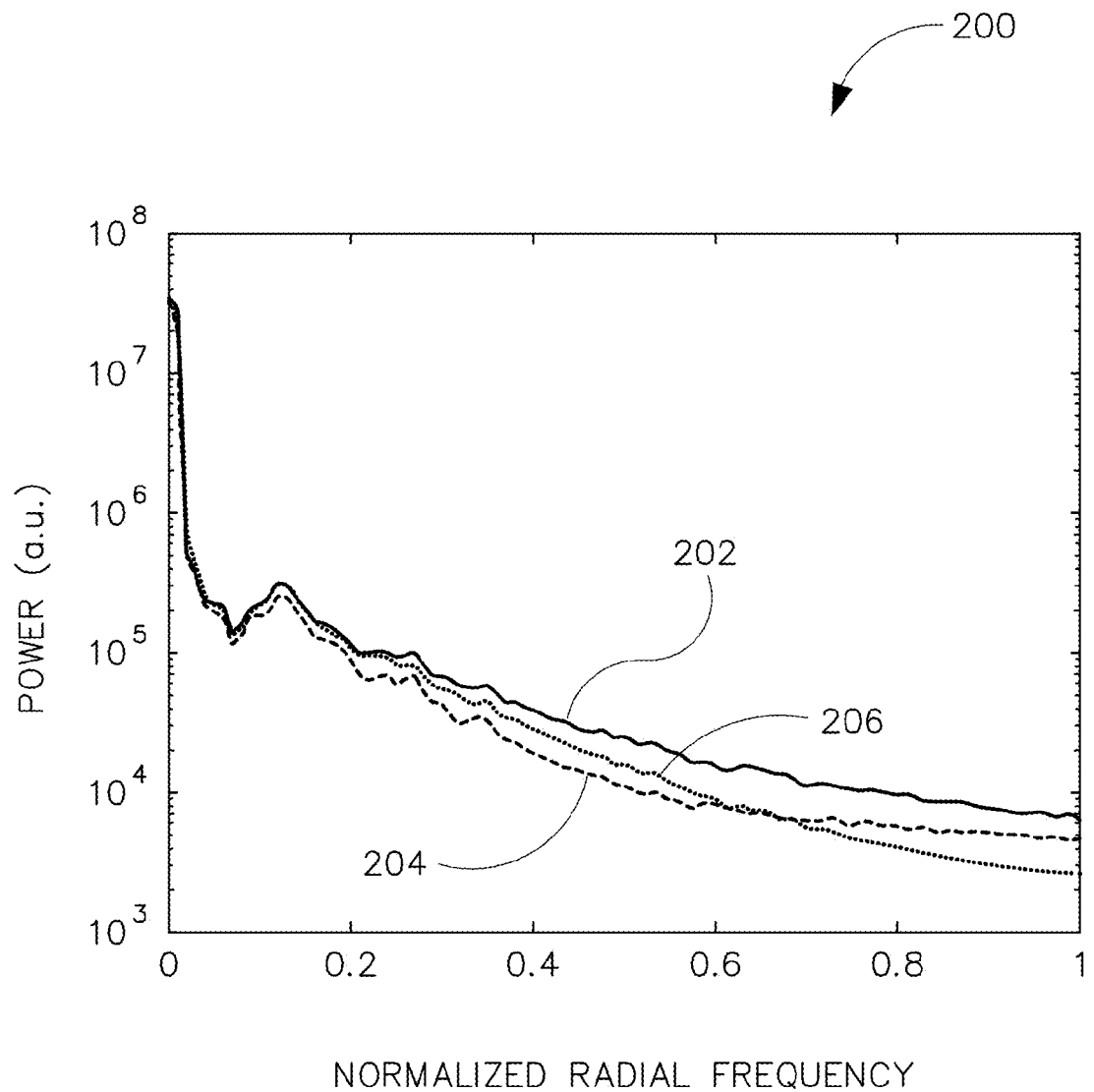
FIG. 4 illustrates an effect of blurring one image using an exemplary Gaussian kernel.

Referring to FIG. 4, in one example first radial frequency spectrum 202 is blurred 206 with a Gaussian kernel with a 0.9 pixel standard deviation width. As can be seen in FIG. 4, the spectrum of blurred image 206 departs from the actual image 204 captured by the imaging system. Similar behavior can be shown for different standard deviations of the Gaussian kernel, and similar behavior can also be shown for other blurring kernels, such as a pillbox kernel with different standard deviations.

Thus, it can be observed that neither the Gaussian nor the pillbox blurring kernels are able to acceptably reproduce one defocused image from another image. As such, according to the invention, information about the PSF of the lens is experimentally or empirically obtained instead of using a theoretical kernel such as a Gaussian or a pillbox. As seen in the exemplary FIGS. 3 and 4, the high frequency content appears to be present in both images, which can be attributed to electronic and quantization noise. As a result, it is unlikely that high frequency content of images can be relied upon for DFD calculations. Thus, a low pass pre-filter can be used to remove the high frequency portion of the spectrum before further processing.

Figure 5:
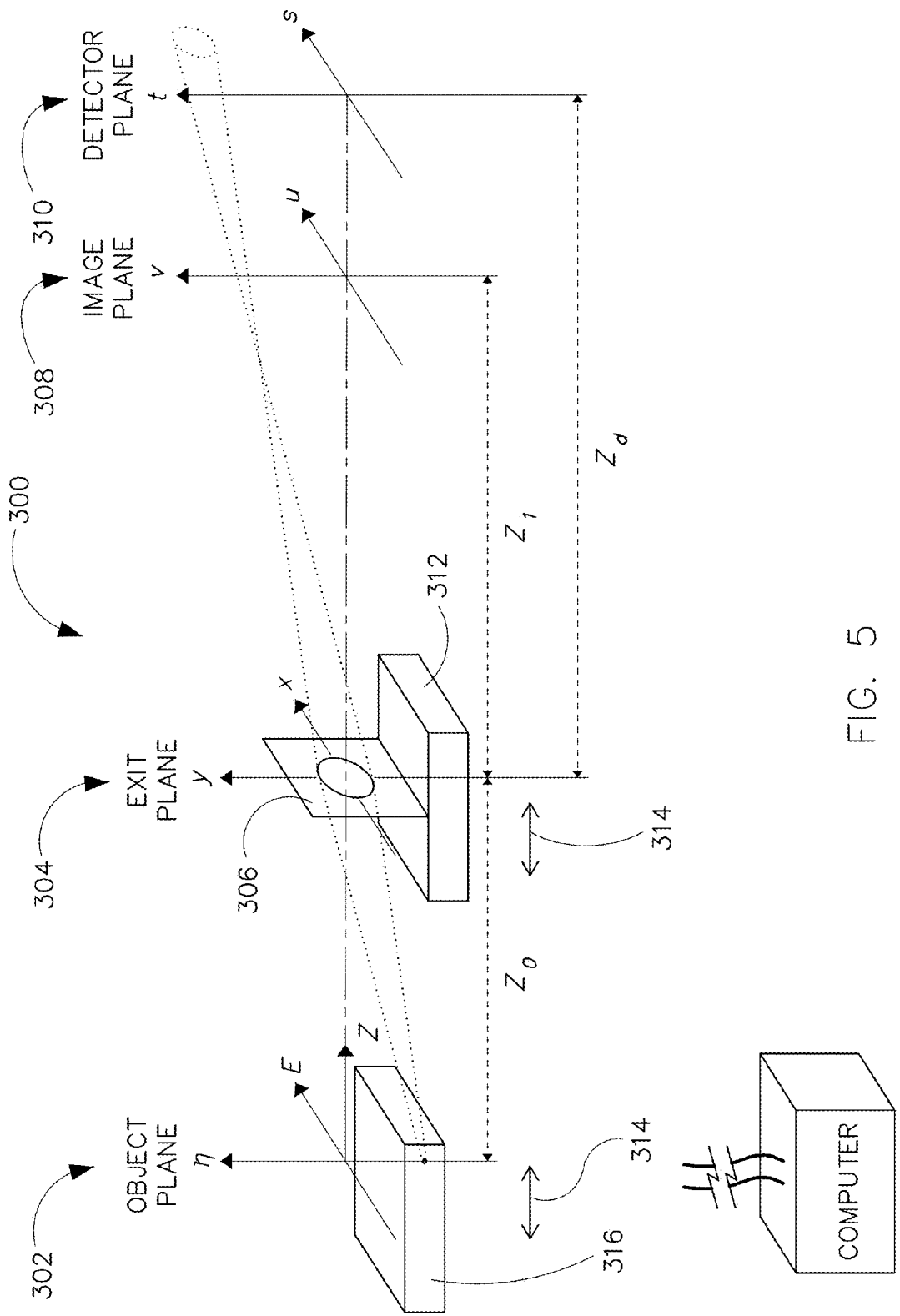
FIG. 5 illustrates coordinate systems used to identify planes in the lens in reference to embodiments of the invention.

Accordingly, if an imaging lens does not exhibit a typical Gaussian, pillbox, or other analytical form PSF, the required information can be derived empirically or through pupil map for designing a reliable DFD-based depth estimator, according to the invention. Referring to FIG. 5, a framework 300 includes an object plane 302, an exit pupil 304 (which corresponds to a location of a lens 306), an image plane 308, and a detector plane 310 (of, for instance, a charge-coupled device, or CCD). Photons emanate from object plane 302, pass through exit pupil 304, and form a clean image at image plane 308 which, depending on distances and characteristics of the imaging system, may not coincide with the location of the detector plane 310. Thus, system 300 represents an imaging system which can change its focal length.

The imaging lens characteristics are reduced to its exit pupil. Typically, a pupil function map (or pupil map) is a wavefront at the exit pupil of the imaging system for a given object position in space. As known in the art, as distance $z_o$ between object plane 302 and exit pupil 304 is varied, image plane 308, at a distance $z_i$ from exit pupil 304 likewise varies. As such and for clarification, it is desired to know the value of $z_o$ that will place image plane 308 coincident with detector plane 310 such that a clean or sharply focused image of an object at object plane 302 may be obtained. According to one embodiment and as illustrated, lens 306 may be positioned on a moveable stage 312 that may itself be translatable along a translation axis 314, which may be used to obtain a plurality of elemental images of an object that is positioned at object plane 302. Typically, an elemental image is a single image taken with a specific lens setting and configuration (i.e., focal length). Distance $z_o$ may be altered in other fashions according to the invention. For instance, the object at object plane 302 may instead be translated by an object translator 316 that can translate object plane 302 along translation axis 314. Further, distance $z_o$ may also be altered, according to the invention, using other techniques known in the art that include but are not limited to a variable path window, a prism, a piezo-electric translator, a birefringent optic, and the like. As such, distance $z_o$ may be actually and physically affected by physical movement of the object and/or the lens, or distance $z_o$ may be virtually affected by altering an apparent distance therebetween by using, for instance, the variable path window, the prism, or the birefringent optic, as examples.

Figure 6:
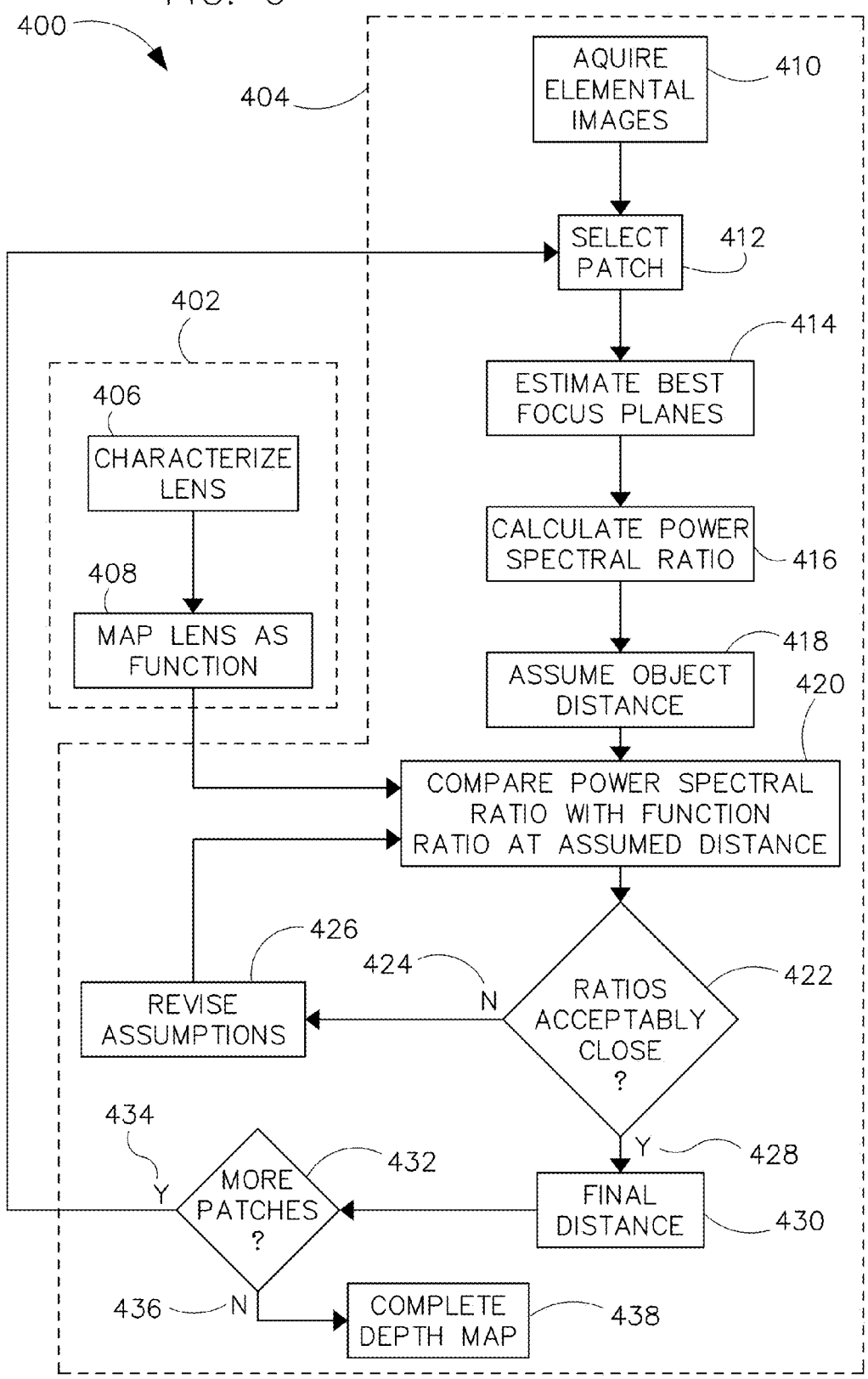
FIG. 6 illustrates a method of correcting an image using depth-from-defocusing (DFD), according to the invention.

Referring now to FIG. 6, a method of obtaining a depth of an object is illustrated therein. And, as stated, although embodiments of the invention are described as they relate to acquisition of fingerprint images, it is contemplated that the invention described herein is applicable to a broader array of imaging technologies. For instance, in other applications where a DFD technique is not optimized because known kernels do not adequately represent properties of the imaging system, such as a PSF of the lens.

FIG. 6 illustrates a technique or method 400, according to the invention, having an offline component 402 and an online component 404. Generally, offline component 402 includes steps for empirically characterizing a lens, such as lens 306 of illustrated in the system of FIG. 5. Online component 404 includes acquisition of images, and manipulation thereof by taking into account the characterization of the lens and the PSF or pupil function derived from offline component 402.

The overall technique 400 is described as follows: Referring back to FIG. 5, a pupil function is represented as p(x,y) and PSF with h(x,y) which can be found through lens design software packages or empirically through various methods including interferometry. Note that the pupil function and PSF on the imaging plane have the following relationship:

$$h(u,v;\gamma,z_o)=\Im\{p(-\lambda z_i x,-\lambda z_i y;\gamma,z_o)\};\qquad \text{Eqn. 2,}$$

where $\Im\{\bullet\}$ denotes Fourier transformation and $\gamma$ denotes a particular focal setting on the lens, and $\lambda$ is the illumination wavelength. As the scaled version of Fourier pairs are related through Fourier transform as:

$$p(x,y)\overset{\Im}{\leftrightarrow} P(f_x,f_y) \qquad \text{Eqn. 3,}$$

$$p(-\lambda z_i x, -\lambda z_i y)\overset{\Im}{\leftrightarrow}\frac{1}{\lambda z_i}P\left(\frac{f_x}{-\lambda z_i},\frac{f_y}{-\lambda z_i};\gamma,z_o\right);$$

one can write:

$$h(u,v;\gamma,z_o)=\frac{1}{\lambda z_i}P(f_x=-\lambda z_i u, f_y=-\lambda z_i v;\gamma,z_o); \qquad \text{Eqn. 4.}$$

However, because the detector plane does not coincide with the image plane in general, a quadratic phase factor (defocus) can be used to compensate the pupil function and account for this distance:

$$h(s,t;\gamma,z_o)=\Im\{e^{jk(x^2+y^2)}p(-\lambda z_i x,-\lambda z_i y;\gamma,z_o)\} \qquad \text{Eqn. 5,}$$
$$=\Im\{p'(-\lambda z_i x,-\lambda z_i y;\gamma,z_o)\}$$
$$=\frac{1}{\lambda z_i}P'(-\lambda z_i s,-\lambda z_i t;\gamma,z_o);$$

where $$k=\frac{\pi}{\lambda}\left(\frac{1}{z_i}-\frac{1}{z_d}\right)$$

is related to the distance between image plane and detector plane and vanishes when imaging condition holds, i.e. $z_i=z_d$.

Next, the image formed on the detector can be written as a convolution between the PSF and an ideal image, such as:

$$i_\gamma(s,t) = i_0(s,t) \otimes h(s,t;\gamma,z_o)$$

$$I_\gamma(f_s,f_t) = I_0(f_s,f_t) \times H(f_s,f_t;\gamma,z_o); \quad \text{Eqn. 6.}$$

By invoking the duality principle of Fourier transformation, it can be shown that:

$$p(s,t) \cdot \overset{\mathfrak{J}}{\leftrightarrow} P(f_s, f_t) \quad \text{Eqn. 7.}$$

$$P(s,t) \cdot \overset{\mathfrak{J}}{\leftrightarrow} 2\pi p(-f_s, -f_t)$$

$$P(-\lambda z_i s, -\lambda z_i t) \cdot \overset{\mathfrak{J}}{\leftrightarrow} \frac{2\pi}{\lambda z_i} p\left(\frac{f_s}{\lambda z_i}, \frac{f_t}{\lambda z_i}\right);$$

Thus, $$H(f_s, f_t; \gamma, z_o) = \frac{2\pi}{\lambda^2 z_i^2} p'\left(\frac{f_s}{\lambda z_i}, \frac{f_t}{\lambda z_i}; \gamma, z_o\right); \quad \text{Eqn. 8.}$$

The image spectra can be re-written as:

$$I_\gamma(f_s, f_t) = \frac{2\pi}{\lambda^2 z_i^2} I_0(f_s, f_t) \times p'\left(\frac{f_s}{\lambda z_i}, \frac{f_t}{\lambda z_i}; \gamma, z_o\right); \quad \text{Eqn. 9,}$$

and the spectral ratio as:

$$\frac{I_{\gamma_1}(f_s, f_t)}{I_{\gamma_2}(f_s, f_t)} = \frac{p'\left(\frac{f_s}{\lambda z_i}, \frac{f_t}{\lambda z_i}; \gamma_1, z_o\right)}{p'\left(\frac{f_s}{\lambda z_i}, \frac{f_t}{\lambda z_i}; \gamma_2, z_o\right)}; \quad \text{Eqn. 10,}$$

which holds point for point for different $(f_s, f_t)$ and can be expressed in Polar coordinates as:

$$\frac{I^p_{\gamma_1}(\rho, \theta)}{I^p_{\gamma_2}(\rho, \theta)} = \frac{p'_p\left(\frac{\rho}{\lambda z_i}, \theta; \gamma_1, z_o\right)}{p'_p\left(\frac{\rho}{\lambda z_i}, \theta; \gamma_2, z_o\right)}; \quad \text{Eqn. 11,}$$

where $p'(f_s,f_t) \leftrightarrow p'_p(\rho,\theta)$ results in $p'(af_s,af_t) \leftrightarrow p'_p(a\rho,\theta)$. Script p denotes Polar coordinates.

The pupil function can be expressed with Zernike polynomials, in one example, as:

$$p'_p(\rho,\theta;\gamma,z_o) = W_{11}^{\gamma,z_o}\rho\cos\theta + W_{20}^{\gamma,z_o}\rho^2 + W_{40}^{\gamma,z_o}\rho^4 + W_{41}^{\gamma,z_o}\rho^3\cos\theta + W_{22}^{\gamma,z_o}\rho^2\cos^2\theta, \quad \text{Eqn. 12.}$$

Zernike polynomials are a set of polynomial functions, as illustrated in Eqn. 12, that can be used to describe a wavefront efficiently. They act as basis functions to describe a more complex function. It is contemplated, however, that the invention is not limited to expression of the pupil function with Zernike polynomials, but that other functions, such as Abbe formulation may be used.

Substituting in Eqn. 12 results in:

$$\frac{I^p_{\gamma_1}(\rho,\theta)}{I^p_{\gamma_2}(\rho,\theta)} = \frac{W_{11}^{\gamma_1,z_o}\cos\theta + W_{20}^{\gamma_1,z_o}(\lambda z_o)^2\rho + W_{40}^{\gamma_1,z_o}\rho^3 + W_{41}^{\gamma_1,z_o}\lambda z_o\rho^2\cos\theta + W_{22}^{\gamma_1,z_o}(\lambda z_o)^2\rho\cos^2\theta}{W_{11}^{\gamma_2,z_o}\cos\theta + W_{20}^{\gamma_2,z_o}(\lambda z_o)^2\rho + W_{40}^{\gamma_2,z_o}\rho^3 + W_{41}^{\gamma_2,z_o}\lambda z_o\rho^2\cos\theta + W_{22}^{\gamma_2,z_o}(\lambda z_o)^2\rho\cos^2\theta}; \quad \text{Eqn. 13,}$$

which is a polynomial with focal setting dependent coefficients and can be written in shorthand as:

$$\hat{z}_o = \underset{z_o \in [z_{min}, z_{max}]}{\operatorname{argmin}} \left\| \frac{I^p_{\gamma_1}(\rho,\theta)}{I^p_{\gamma_2}(\rho,\theta)} - \frac{p'_p(\rho/\lambda z_i, \theta; \gamma_1, z_o)}{p'_p(\rho/\lambda z_i, \theta; \gamma_2, z_o)} \right\|; \quad \text{Eqn. 14.}$$

Referring to Eqn. 13, offline calculation 402 provides the values of the second fraction, and the elemental images acquired via online component 404 can be processed (Fourier Transformed) to calculate the first fraction, according to the invention. The minimization strategy, according to the invention, is then to find object distance $z_o$ such that the difference between the two fractions vanishes. This process is done for many points on the finger to map out the surface.

As stated, offline component 402 according to the invention includes characterization of the lens using a series of mathematical steps as discussed hereinbelow. In a spectral domain DFD algorithm, the Fourier transform of the intensity distribution on the CCD for a given point source needs to be known. As shown in FIG. 5, the image plane and the CCD plane do not coincide and hence the simple Fourier relationship between the PSF and pupil function is not valid. However, angular spectrum propagation between the pupil function and the CCD plane can be used to calculate the Fourier transform of light distribution on the CCD plane (angular spectrum at (x,y) plane) based on the Fourier transform (angular spectrum) of the pupil function (adjusted with an additional quadratic phase). The following equations show the process:

Need: $\mathfrak{J}\{I(x,y)\} \propto AS(x,y)$ $AS(x,y) \propto AS(\xi,\eta) \times e^{j\phi(\xi,\eta)}$ $\phi(\xi,\eta) = f(\xi,\eta,z_d)$ $AS(\xi,\eta) = AS_{sph}(\xi,\eta) \otimes AS_{ab}(\xi,\eta); \quad \text{Eqns. 15.}$ $AS_{sph}(\xi,\eta)$: can be found analytically (avoid aliasing) very high frequency at the perphery of exit pupil $AS_{ab}(\xi,\eta) = g(W_{ab})$: can be computed based on Zernikes $W_{ab}$: aberration (varies by object depth)

Referring to FIG. 5, the schematic shows the coordinate systems at exit pupil, CCD and image planes as well as typical sizes for a fingerprint lens. The distance $z_d$ between the exit pupil and CCD plane is fixed, however the distance between the exit pupil and the image plane changes depending on the object location and lens focal configuration. The size of exit pupil of lens 306 varies slightly for different object distances.

In order to calculate the Fourier transform of the pupil function, a very large (for example, 35000×35000) discrete Fourier transform (DFT) calculation is needed, which can be prohibitive. This is due to the fact the reference spherical wavefront exhibits rapid phase fluctuations at the edge of the pupil. To calculate the angular spectrum of such a field, the spatial sampling should satisfy Nyquist criteria. The following calculations show what spatial sampling period (and size of matrix) is, according to one example:

The maximum cosine angle of the planar wavefront at the edge of pupil (D=32 mm) representing the reference sphere focusing at $z_f$=55 mm (pupil to image point distance) is:

$$\alpha_{max} = \cos(\omega) = \frac{D/2}{\sqrt{(D/2)^2 + z_f^2}} = \frac{16}{57.2} = 0.28; \quad \text{Eqn. 16.}$$

which according to relationship $\alpha = \lambda f_\xi$ suggests:

$$\max(f_\xi) = \alpha_{max}/\lambda = 0.28/(0.52 \times 10^{-3}) = 538 \text{ 1/mm}; \quad \text{Eqn. 17.}$$

According to Nyquist rate, capturing this frequency requires a spatial sampling interval of $$d_\xi = \frac{1}{2\max(f_\xi)} = 0.93 \; \mu m$$

or about 35,000 samples of wavefront across the 32 mm diameter. As such, the DFT should then operate on a 35,000× 35,000 matrix, which may be impractical, and which may result in undersampling. Thus, the angular spectrum at pupil function may be calculated indirectly.

The aberration part of the wavefront is typically not high frequency and its angular spectrum can be calculated through DFT. This suggests breaking down the calculation of the total pupil wavefront angular spectrum into two problems:

1. Calculate the angular spectrum of the wavefront aberration through DFT.
2. Directly compute the angular components (planar wavefronts) of the reference spherical wave at predetermined frequencies. Since we know exactly what these planar wavefronts are, we can calculate them at any position on the pupil without introducing aliasing caused by DFT.

The sampling across the pupil can be relatively sparse (for example, 128×128). In this example, lens aberrations are not high frequency, thus can be captured with $n_{ab}$ samples in both directions. For $n_{ab}$=256, or $d_\xi = D/n_{ab}$=0.125 mm, this leads to maximum frequency of $\max(f_\xi) = \frac{1}{2}d_\xi = 4$ mm$^{-1}$.

As known in the art, the angular components can be directly calculated for each directional cosine pair $(\alpha, \beta)$. The plane wave component on pupil plane at position $(\xi,\eta)$ can be written as:

$$\exp(-j\vec{k}\cdot\vec{r}) = \exp\left(-j\frac{2\pi}{\lambda}(\alpha\xi + \beta\eta)\right); \quad \text{Eqn. 18,}$$

where there is a map that converts any $(\alpha, \beta)$ pair to pupil coordinates $(\xi,\eta)$. This relationship is defined as:

$$\xi = z_f \frac{1 - \sqrt{1 - 2\alpha^2}}{\alpha}; \quad \text{Eqn. 19,}$$

and $$\eta = z_f \frac{1 - \sqrt{1 - 2\beta^2}}{\beta}; \quad \text{Eqn. 20.}$$

The equations that map frequency to directional cosines include:

$$\alpha = \lambda f_\xi;$$

$$\beta = \lambda f_\eta. \quad \text{Eqn. 21, and}$$

Thus, for any given discrete grid of $(f_\xi, f_\eta)$, the plane wave component can be calculated through equations above. This approach can be taken to directly calculate the angular spectrum at a predefined frequency grid that extends to the maximum frequency present on the reference sphere. Because maximum frequency in the present example is $\max(f_\xi)$=538 mm$^{-1}$, a frequency grid with 2000 elements is included in each direction that covers a [−538,+538] mm$^{-1}$ region. Angular components calculated on this grid will thus be free from aliasing.

The next step is to do the convolution between the aberration wavefront and spherical wavefront angular frequencies. Once both reference wavefront and aberration angular spectra are calculated, they can be convolved to arrive at the total wavefront angular spectrum:

$$AS(\xi,\eta) = AS_{sph}(\xi,\eta) \otimes AS_{ab}(\xi,\eta); \quad \text{Eqn. 22.}$$

Thus, according to the invention and referring back to FIG. 6, offline component 402 includes, at a high-level, the step of characterizing the lens 406 and mapping the lens as a mathematical function 408. Offline component 402 may be characterized as a calibration step, performed once, that characterizes a lens thoroughly and is done through a pupil map function which describes the amount of aberration for every point in object space. The pupil function changes for objects at different locations. The results of offline component 402 thus provide a characterization of a lens which, as stated, result in the coefficients illustrated in the second fraction of Eqn. 13. More generally, mathematical function 408 may be obtained as a general equation that includes the use of pupil functions, as illustrated in Eqn. 11. However, according to one embodiment, the pupil function is mathematically described as a pupil function map through Zernicke coefficients as in Eqn. 13. As such, the lens is characterized based on its response to point sources in different locations in a volume of interest, and characterization tables may be generated in a table that maps the distance of the object to a set of parameters which can be measured from images during the online process, and based on the mathematical description disclosed herein.

Online component 404, includes a series of high-level steps consistent with the mathematical description above. Online component 404 begins by acquiring two or more elemental images 410 of an object for which it is desired to generate a depth map. A patch of the object is selected at step 412, and best focus planes are estimated at step 412 using, for instance, a known DFF method or algorithm, out of the elemental images. Once the best focus planes are estimated, a power spectral ratio between elemental images is obtained at step 416, which will thereby be used to compare to a ratio of the lens function that was obtained corresponding to the same elemental image locations, consistent with Eqn. 11. At step 418, object distance is assumed and at step 420 a function ratio is calculated, based on the lens function obtained at step 408 and based on the assumed object distance from step 418. At 420, as well, the ratios are compared, consistent with Eqn. 11, and at step 422 it is determined whether the ratios are within a threshold. If not 424, then iteration continues and object distance assumptions are revised at step 426, and control returns to step 420 to be compared, again, to the power spectral ratio obtained at step 416.

Thus, according to the invention, elemental images are obtained, best focus planes are estimated using a known technique (DFF), and a power spectrum ratio is calculated. The mapped function is calculated that corresponds to each of the elemental functions, but based on an assumption of an object distance as a starting point. A ratio of the mapped function is calculated that corresponds to the elemental images, as well as a ratio of the elemental images themselves. Iteration thereby includes revision of the mapped function ratio by revising the assumed object distance, which continues until the two ratios compare to a reasonable threshold. In summary, a ratio of pupil functions at two different lens settings (e.g., focal lengths) is equal to the ratio of the power spectrum between the two images formed by the two lens settings. The distance $z_o$ at which the ratio of the power spectrum between two best focus elemental images (which can be found by DFF, independent of $z_o$) is closest to the ratio of pupil functions at an object distance equal to $z_o$. This distance $z_o$ is the estimated distance of the object from the lens.

Referring still to FIG. 6, once the ratios are acceptably close 428, then a final distance is obtained at step 430 for the patch selected at step 412. At step 432 a determination is made as to whether additional patches will be assessed. If so 434, then control moves back to step 412, another patch is selected, and the process repeats for the newly selected patch. However, if no additional patches 436, then the process ends at step 438 where a complete depth map is generated.

According to additional embodiments of the invention, the contactless multi-fingerprint collection device is configured to acquire fingerprint data for the fingers of the subject without the subject's hand being in a stationary position, but rather being moved (i.e., swiped or waved) through an imaging volume. That is, rather than guiding the subject to place their fingers in a specified image capture location, the contactless multi-fingerprint collection device acts to track a location of the subject's fingers and cause the image capture device(s) to acquire images of the fingers.

According to embodiments of the invention, one or more positioning verification devices may include devices (e.g., overhead camera) that function as tracking devices that are used to verify and track movement of a subject's hand within an imaging volume for purposes of controlling the image capture devices. That is, a field-of-view and focus depth of each image capture device can be independently set based on a movement and placement of the subject's hand/fingers as tracked by tracking devices, so as to enable following of individual fingertips. The moving of the field-of-view of each image capture device can be accomplished via a mechanical actuation of one or more elements or via an electronic/digital controlling of each image capture device. For example, in an embodiment where one or more elements are mechanically actuated to move the field-of-view, a mirror positioned adjacent the image capture device could be rotated or a lens element could be moved in order to shift the field-of-view of the image capture device. In an embodiment where electronic or digital controls are implemented, a sensor in the image capture device (i.e., camera sensor) could be controlled to shift the field-of-view of the image capture device.

Various methods may be used to register the image. As used herein registration refers to a process of transforming the different images of a single subject into one coordinate system. In the context of a fingerprint, registered images are derived from the captured images of the fingerprint. The registered images have the same scale and feature position.

In order to ensure the features from the multiple shifted images are approximately registered, a telecentric lens system is also commonly used that maintains magnification within a narrow range. However, as known in the art, the addition of a telecentric aperture inherently increases the f-number and may result in an excessive depth-of-field.

In certain registration embodiments, registration may use a geographic information system (GIS) employing ortho-rectification. Ortho-rectification is a process of remapping an image to remove the effect of surface variations and camera position from a normal perspective image. The resultant multiple images are perspective corrected projections on a common plane, representing no magnification changes with a pixel to pixel correspondence. In certain embodiments, ortho-rectification may comprise un-distorting each captured image using 3D calibration information of the image capture device, and projection of the image onto one plane.

Once the images are registered, image fusion is used to create a single high-resolution image from the multiple images of the same target. Generally, image fusion is the procedure of combining information from multiple images into a single image whereas in the said embodiment this information relate to the local, spatial focus information in each image. The re-fused image would desirably appear entirely in-focus while the source images are in-focus in different, specific regions. This may be accomplished by using selected metrics. These metrics are chosen based on the fact that the pixels in the blurred portions of an image exhibit specific different feature levels, in comparison to those pixels that are in good focus. For example, focused images typically contain higher frequencies while blurred images have lower frequency components.

In certain embodiments, certain metrics may be used to compute the level of focus for each pixel in each separately obtained image of the fingerprint. The separate images are then normalized and combined using a weighted combination of the pixels to obtain a single fused or composite image. Thus, for each of the acquired images, the region of interest is determined by image segmentation. From the different metrics the focus at each location in the image is calculated as a weighted combination of features, then the images are combined using said local weighted combination of the features.

Upon generation of a composite image of a fingerprint, a contour map or "depth map" of the composite image for each of the plurality of fingerprints is calculated/generated using the disclosed depth from defocus (DFD) algorithm. The depth from focus analysis/calculation is an image analysis method combining multiple images captured at different focus distances to provide a 3D map correlating in-focus locations in each image with a known focus distance the specific image was captured at.

In order to match the fingerprint images captured to standard databases based upon 2D data capture, the 3D model obtained from the disclosed DFD algorithm may be used to generate an unrolled 2D image. The model used simulates the image distortions corresponding to the reverse of the projection of the fingerprint surface on a two-dimensional projection obtained in a contact method.

Therefore, according to one embodiment of the invention, an imaging system includes a positionable device configured to axially shift an image plane, wherein the image plane is generated from photons emanating from an object and passing through a lens, a detector plane positioned to receive the photons of the object that pass through the lens, and a computer programmed to characterize the lens as a mathematical function, acquire two or more elemental images of the object with the image plane of each elemental image at different axial positions with respect to the detector plane, determine a focused distance of the object from the lens, based on the characterization of the lens and based on the two or more elemental images acquired, and generate a depth map of the object based on the determined distance.

According to another embodiment of the invention, a method of imaging includes mathematically characterizing a lens as a mathematical function, acquiring two or more elemental images of an object with an image plane of the object at differing axial positions with respect to a detector, determining a first focused distance of the image plane to the object such that the image plane is located at the detector, based on the mathematical characterization of the lens and based on the first and second elemental images, and generating a depth map of the object based on the determination.

According to yet another embodiment of the invention, a non-transitory computer readable storage medium having stored thereon a computer program comprising instructions which, when executed by a computer, cause the computer to derive a pupil function of a lens, acquire elemental images of an object at different locations of an image plane of the object with respect to a detector, determine where to place the image plane of the first patch of the object based on the pupil function and based on the acquired elemental images of the first patch of the object, and generate a depth map of the object based on the determination.

A technical contribution for the disclosed method and apparatus is that it provides for a computer implemented system and method for depth from defocus imaging, and more particularly to a contactless multi-fingerprint collection device.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An imaging system comprising:
    a shiftable image plane generated from photons emanating from an object and passing through a lens;
    a detector plane positioned to receive the photons of the object that pass through the lens; and
    a computer programmed to:
        characterize the lens as a lens function;
        acquire two or more elemental images of the object with the image plane at different axial positions with respect to the detector plane;
        determine a focused distance of the object from the lens based on the lens function and the two or more elemental images acquired; and
        generate a depth map of the object based on the determined focused distance.

2. The system of claim 1 wherein the computer, in being programmed to characterize the lens, is further programmed to characterize the lens as a function of a lens aberration profile and a point spread function (PSF) that is a response to point sources that are positioned at different locations with respect to the lens.

3. The system of claim 2 wherein the computer is programmed to model the PSF as a Fourier transform of a pupil function of the imaging system that is represented in a form of multiple polynomials.

4. The system of claim 3 wherein the multiple polynomials are Zernike polynomials up to third order aberrations.

5. The system of claim 1 wherein the object is a finger and the two or more elemental images of the object include at least two patches of a fingerprint of the finger.

6. The system of claim 1 wherein the computer is programmed to determine the object distance using a power spectrum ratio between the two elemental images.

7. The system of claim 6 wherein, when the object is a three-dimensional object, then the power spectrum ratio is determined between associated patches in two elemental images of the two or more elemental images.

8. The system of claim 6 wherein the computer is programmed to determine the power spectrum ratio using a Fourier transform.

9. The system of claim 6 wherein the computer is programmed to:
    calculate a first value of a pupil function that corresponds with the first elemental image;
    calculate a second value of the pupil function that corresponds with the second elemental image;
    determine a ratio of the first value of the function and of the second value of the function; and
    minimize a difference between:
        the ratio of the first value and the second value; and
        the power spectrum ratio;
    wherein the difference is minimized by mathematically searching for a distance from the object to the lens that achieves the minimization.

10. A method of imaging an object comprising:
    characterizing a lens as a mathematical function;
    acquiring elemental images of the object with an image plane of the object at differing axial positions with respect to a detector;
    determining a focused distance of the image plane to the object based on the characterization of the lens and based on the elemental images; and generating a depth map of the object based on the determination.

11. The method of claim 10 wherein mathematically characterizing the lens comprises mathematically characterizing the lens as the mathematical function that is based on an aberration profile of the lens and based on a response to point sources that are positioned at different locations with respect to the lens.

12. The method of claim 10 wherein the first focused distance is a distance to a first patch of the object, and wherein the method further comprises:
  determining a second focused distance of the object plane to the object based on the mathematical characterization of the lens and based on the elemental images, wherein the second focused distance is a distance to a second patch of the object; and
  generating the depth map using the first patch of the object and the second patch of the object.

13. The method of claim 10 wherein mathematically characterizing the lens further comprises:
  modeling a point spread function (PSF) as a Fourier transform of the imaging system pupil function; and
  representing the pupil function as one or more polynomials.

14. The method of claim 13 wherein representing the pupil function further comprises representing the pupil function as one or more Zernike polynomials up to third order aberrations.

15. The method of claim 10 comprising:
  determining an elemental image ratio of the elemental images using a ratio of a power spectrum as determined for two of the elemental images; and
  determining the first focal distance of the image plane of the object includes using the elemental image ratio.

16. The method of claim 15 comprising determining the elemental image ratio using a Fourier transform of two of the elemental images.

17. The method of claim 15 comprising:
  calculating a first value of the mathematical function that corresponds with a first elemental image of the elemental images;
  calculating a second value of the mathematical function that corresponds with a second elemental image of the elemental images;
  calculating a mathematical function ratio of the first value and the second value; and
  minimizing a difference between the elemental image ratio and the mathematical function ratio by mathematically varying a distance from the object to the lens when calculating the first value of the mathematical function and the second value of the mathematical function.

* * * * *